(12) United States Patent
Yoshitomi et al.

(10) Patent No.: US 10,808,625 B2
(45) Date of Patent: Oct. 20, 2020

(54) GEAR COOLING STRUCTURE

(71) Applicant: KAWASAKI JUKOGYO KABUSHIKI KAISHA, Kobe-shi, Hyogo (JP)

(72) Inventors: Mamoru Yoshitomi, Akashi (JP); Hirofumi Akahori, Akashi (JP); Hidenori Arisawa, Kakogawa (JP); Yuji Shinoda, Kobe (JP); Seiji Yamashita, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 311 days.

(21) Appl. No.: 15/748,680

(22) PCT Filed: Jul. 27, 2016

(86) PCT No.: PCT/JP2016/003484
§ 371 (c)(1),
(2) Date: Jan. 30, 2018

(87) PCT Pub. No.: WO2017/022214
PCT Pub. Date: Feb. 9, 2017

(65) Prior Publication Data
US 2020/0080494 A1 Mar. 12, 2020

(30) Foreign Application Priority Data
Jul. 31, 2015 (JP) .................... 2015-151726

(51) Int. Cl.
*F16H 57/04* (2010.01)
*F02C 7/36* (2006.01)
*F16H 57/08* (2006.01)

(52) U.S. Cl.
CPC .......... *F02C 7/36* (2013.01); *F16H 57/0479* (2013.01); *F05D 2220/323* (2013.01);
(Continued)

(58) Field of Classification Search
CPC ............. F16H 57/0479; F16H 57/0482; F16H 57/0456; F16H 57/082; F16H 57/0486; F16H 57/0427
See application file for complete search history.

(56) References Cited

U.S. PATENT DOCUMENTS 6,039,667 A * 3/2000 Schunck ............. F16H 57/0427
184/11.4
9,291,255 B2 * 3/2016 Imai ....................... B64C 27/12
(Continued)

FOREIGN PATENT DOCUMENTS

DE 3607711 A1 10/1986
JP 2000-193071 A 7/2000
(Continued)

OTHER PUBLICATIONS

International Search Report for PCT/JP2016/003484, dated Aug. 30, 2016.

*Primary Examiner* — Stacey A Fluhart
(74) *Attorney, Agent, or Firm* — Sughrue Mion, PLLC (57) ABSTRACT

A gear cooling structure includes: a gear including a plurality of teeth extending in a particular direction; and a nozzle that jets out oil toward a toothed surface of the gear. The nozzle extends in the particular direction, and has a width that is narrower than a gap between tips of the plurality of teeth.

11 Claims, 7 Drawing Sheets

(52) U.S. Cl.
CPC .............. *F05D 2260/20* (2013.01); *F05D 2260/40311* (2013.01); *F05D 2260/98* (2013.01); *F16H 57/043* (2013.01); *F16H 57/0427* (2013.01); *F16H 57/0486* (2013.01); *F16H 57/082* (2013.01)

(56) References Cited

U.S. PATENT DOCUMENTS

| | | |
|---|---|---|
| 2008/0006018 A1 | 1/2008 | Sheridan et al. |
| 2013/0095974 A1* | 4/2013 | Imai .................. F16H 57/0479 475/159 |
| 2013/0102432 A1 | 4/2013 | Imai et al. |
| 2015/0065285 A1* | 3/2015 | McCune ............ F16H 57/0423 475/159 |
| 2018/0087654 A1* | 3/2018 | Sheridan .................. F02C 7/36 |

FOREIGN PATENT DOCUMENTS

| | | |
|---|---|---|
| JP | 2007162884 A | 6/2007 |
| JP | 2008-014489 A | 1/2008 |
| WO | 2011/129076 A1 | 10/2011 |

\* cited by examiner

GEAR COOLING STRUCTURE

CROSS REFERENCE TO RELATED APPLICATIONS

This application is a National Stage of International Application No. PCT/JP2016/003484 filed Jul. 27, 2016, claiming priority based on Japanese Patent Application No. 2015-151726 filed Jul. 31, 2015, the contents of all of which are incorporated herein by reference in their entirety.

TECHNICAL FIELD

The present invention relates to a gear cooling structure.

BACKGROUND ART

Conventionally, gears are cooled down by supplying lubricating oil to the gears. For example, Patent Literature 1 discloses a lubricating device in which oil is fed from a pump to a nozzle, and the oil is jetted out of the nozzle toward the toothed surface of a gear.

CITATION LIST

Patent Literature

PTL 1: Japanese Laid-Open Patent Application Publication No. 2000-193071

SUMMARY OF INVENTION

Technical Problem

In some cases, in the lubricating device as described above, the pump is required to be compact due to, for example, limited installation space. In order to meet this requirement, it is necessary to reduce the discharge flow rate of the pump and reduce the flow rate of the oil jetted out of the nozzle. However, in a case where the flow rate of the oil jetted out of the nozzle is reduced, there is a risk that the gears may not be sufficiently cooled down.

In view of the above, an object of the present invention is to provide a cooling structure capable of sufficiently cooling down the gears even if the flow rate of the oil jetted out of the nozzle is low.

Solution to Problem

In order to solve the above-described problems, the inventors of the present invention conducted diligent studies, and as a result of the studies, they have found that in a case where the nozzle that jets out the oil toward the toothed surface of a gear has a circular shape, the oil jetted out of the nozzle hardly reaches the bottom lands of the gear, and this is a factor that lowers the cooling efficiency. To be more specific, when the oil is jetted out of the nozzle having a circular shape, jet streams of oil hit against the sides of adjoining gear teeth and change their directions. Then, the jet streams that have changed their directions interfere with another jet stream directed toward a bottom land. The present invention has been made from these points of view.

Specifically, a gear cooling structure according to the present invention includes: a gear including a plurality of teeth extending in a particular direction; and a nozzle that jets out oil toward a toothed surface of the gear. The nozzle extends in the particular direction, and has a width that is narrower than a gap between tips of the plurality of teeth.

According to the above configuration, the oil that is jetted out of the nozzle having an elongated shape forms a straight jet stream parallel to the teeth. Therefore, unlike the case where the oil is jetted out of the nozzle having a circular shape, the interference among jet streams will not occur, and the oil jetted out of the nozzle reaches the bottom land at a sufficient speed. Therefore, even if the flow rate of the oil jetted out of the nozzle is low, the gear can be sufficiently cooled down. Consequently, a pump for circulating the oil can be made compact.

The gear may be a helical gear, and a plurality of the nozzles may be arranged in an axial direction of the gear. According to this configuration, a region in which the nozzle necessary for jetting out the oil to the entire toothed surface is formed can be made small in the circumferential direction of the gear.

The gear may be at least one of a sun gear and a plurality of planetary gears of a planetary gear device. In the planetary gear device, since the oil concentrates in a narrow region around the sun gear, oil agitation loss is great. By adopting the present invention in such a planetary gear device, the oil supply amount can be reduced, and thereby the oil agitation loss can be reduced.

A baffle may be disposed between adjoining planetary gears of the plurality of planetary gears, the baffle including a distal end surface and a pair of side surfaces, the distal end surface facing a toothed surface of the sun gear, the pair of side surfaces facing toothed surfaces of the adjoining planetary gears. The nozzle may be formed in the distal end surface of the baffle, and may jet out the oil toward the toothed surface of the sun gear. This configuration makes it possible to improve a flow straightening effect of the baffle.

A baffle may be disposed between adjoining planetary gears of the plurality of planetary gears, the baffle including a distal end surface and a pair of side surfaces, the distal end surface facing a toothed surface of the sun gear, the pair of side surfaces facing toothed surfaces of the adjoining planetary gears. The nozzle may be formed in one of the pair of side surfaces of the baffle, the one side surface being positioned at an upstream side in a rotation direction of the sun gear, and the nozzle may jet out the oil toward the toothed surface of one of the planetary gears. According to this configuration, the oil is supplied to the toothed surface of the planetary gear after the sun gear and the planetary gear mesh with each other. Therefore, by utilizing negative pressure that occurs when the teeth of the sun gear and the teeth of the planetary gear separate from each other, the oil can be guided to the bottom lands of the planetary gear. This makes it possible to obtain high cooling efficiency for the planetary gear.

The planetary gear device may be coupled to an aircraft gas turbine engine. According to this configuration, a pump disposed in the gas turbine engine can be made compact, and consequently, the aircraft gas turbine engine can be made compact.

Advantageous Effects of Invention

The present invention makes it possible to sufficiently cool down the gears even if the flow rate of the oil jetted out of the nozzle is low.

DESCRIPTION OF EMBODIMENTS

Figure 1:
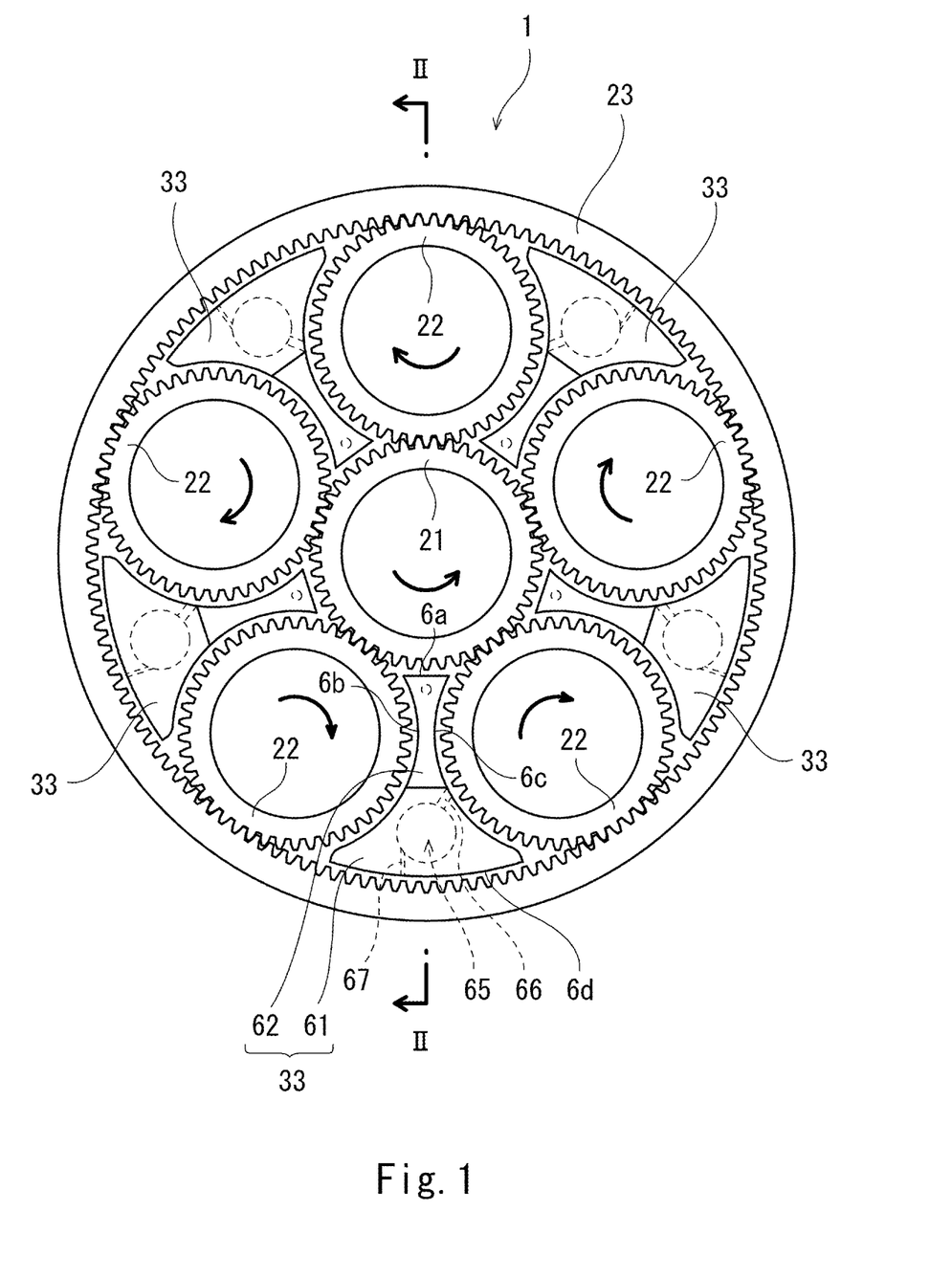
FIG. 1 shows a schematic configuration of a planetary gear device, in which a gear cooling structure according to one embodiment of the present invention is adopted.
Figure 2:
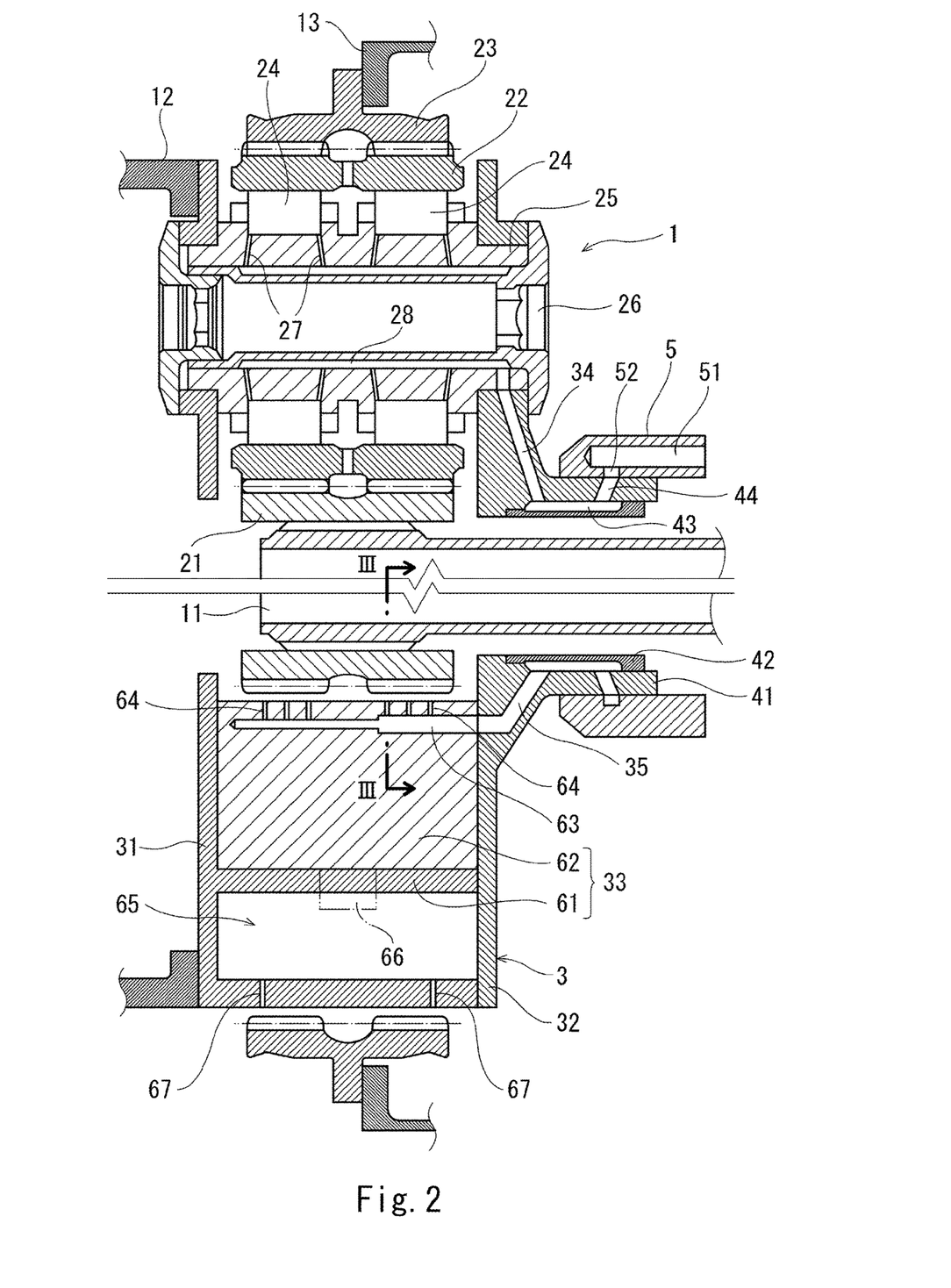
FIG. 2 is a sectional view taken along line II-II of FIG. 1.

FIG. 1 and FIG. 2 show a planetary gear device 1, in which a gear cooling structure according to one embodiment of the present invention is adopted. It should be noted that FIG. 1 shows a schematic configuration of the planetary gear device 1, and components of the planetary gear device 1 other than gears 21 to 23 and baffles 33, which will be described below, are omitted in FIG. 1.

The planetary gear device 1 is coupled to a drive unit (not shown) (e.g., an aircraft gas turbine engine) via an input shaft 11. Hereinafter, for the sake of convenience of the description, the axial direction of the input shaft 11 is referred to as the front-rear direction (the drive unit side is referred to as rear or rearward, and the opposite side is referred to as front or forward).

The planetary gear device 1 includes: a sun gear 21 coupled to the input shaft 11; a plurality of (in the illustrated example, five) planetary gears 22 meshed with the sun gear 21; and a ring gear 23 meshed with the planetary gears 22. In the present embodiment, each of the gears 21 to 23 is a double helical gear. The planetary gears 22 are held by a carrier 3, and the carrier 3 is coupled to an output shaft 12. The output shaft 12 extends forward from the carrier 3. For example, in a case where the aforementioned drive unit is an aircraft gas turbine engine, a fan disposed at the upstream side of the gas turbine engine may be rotated by the output shaft 12.

In the present embodiment, the ring gear 23 is coupled to a support 13, and rotation of the ring gear 23 is restricted. However, as an alternative, the ring gear 23 may be coupled to a secondary output shaft, and may rotate. In this case, the output shaft 12 may extend rearward from the carrier 3, and the secondary output shaft may extend forward from the ring gear 23. As another alternative, rotation of the carrier 3 may be restricted, and only the ring gear 23 may be coupled to an output shaft (the output shaft may extend in any direction).

To be more specific, the carrier 3 includes: a front plate 31 disposed forward of the planetary gears 22; and a back plate 32 disposed rearward of the planetary gears 22. The front plate 31 and the back plate 32 are coupled together via baffles 33, each of which is disposed between adjoining planetary gears 22. The baffles 33 will be described below in detail.

Each planetary gear 22 is rotatably supported by a hollow planet shaft 25 via bearings 24. In the present embodiment, each bearing 24 includes rolling elements (in the present embodiment, rollers). However, as an alternative, the bearings 24 may be plain bearings. Both ends of the planet shaft 25 are fixed to the front plate 31 and the back plate 32 by fastening members 26 penetrating the inside of the planet shaft 25.

An oil storage chamber 28 is formed between the planet shaft 25 and the fastening members 26, and the planet shaft 25 is provided with oil supply holes 27 for leading lubricating oil from the oil storage chamber 28 to the rolling elements of the bearings 24.

In the present embodiment, a lubricating oil passage 34, which communicates with the oil storage chamber 28, is formed in the back plate 32 of the carrier 3 and the planet shaft 25. In other words, the lubricating oil is supplied to the bearings 24 through the lubricating oil passage 34, the oil storage chamber 28, and the oil supply holes 27.

A tubular part 41 extends rearward from the radially inner end of the back plate 32. Inside the tubular part 41, a cover 42, which forms an oil storage chamber 43 between the cover 42 and the tubular part 41, is disposed. The oil storage chamber 43 communicates with the lubricating oil passage 34. The tubular part 41 is provided with a lubricating oil introduction hole 44, which communicates with the oil storage chamber 43.

Outside the tubular part 41, an annular body 5, which slides against the tubular part 41, is disposed. A lubricating oil supply passage 51 is formed in the annular body 5. The lubricating oil supply passage 51 is connected to an oil supply pipe that is not shown. A groove 52 extending continuously in the circumferential direction is formed in the inner peripheral surface of the annular body 5. The lubricating oil supply passage 51 communicates with the lubricating oil introduction hole 44 through the groove 52.

It should be noted that the cover 42 may be integrally formed on the tubular part 41, and the annular body 5 may be disposed inside the cover 42. In this case, the oil storage chamber 43 may be a circular hole extending in the axial direction of the tubular part 41.

Each baffle 33 has a shape similar to that of a space surrounded by the adjoining planetary gears 22, the sun gear 21, and the ring gear 23. Specifically, each baffle 33 includes: a distal end surface 6a, which faces a toothed surface 21a (see FIG. 3) of the sun gear 21; a pair of side surfaces 6b and 6c, which faces toothed surfaces 22a (see FIG. 3) of the adjoining planetary gears 22; and a base surface 6d, which faces a toothed surface of the ring gear 23.

Figure 3:
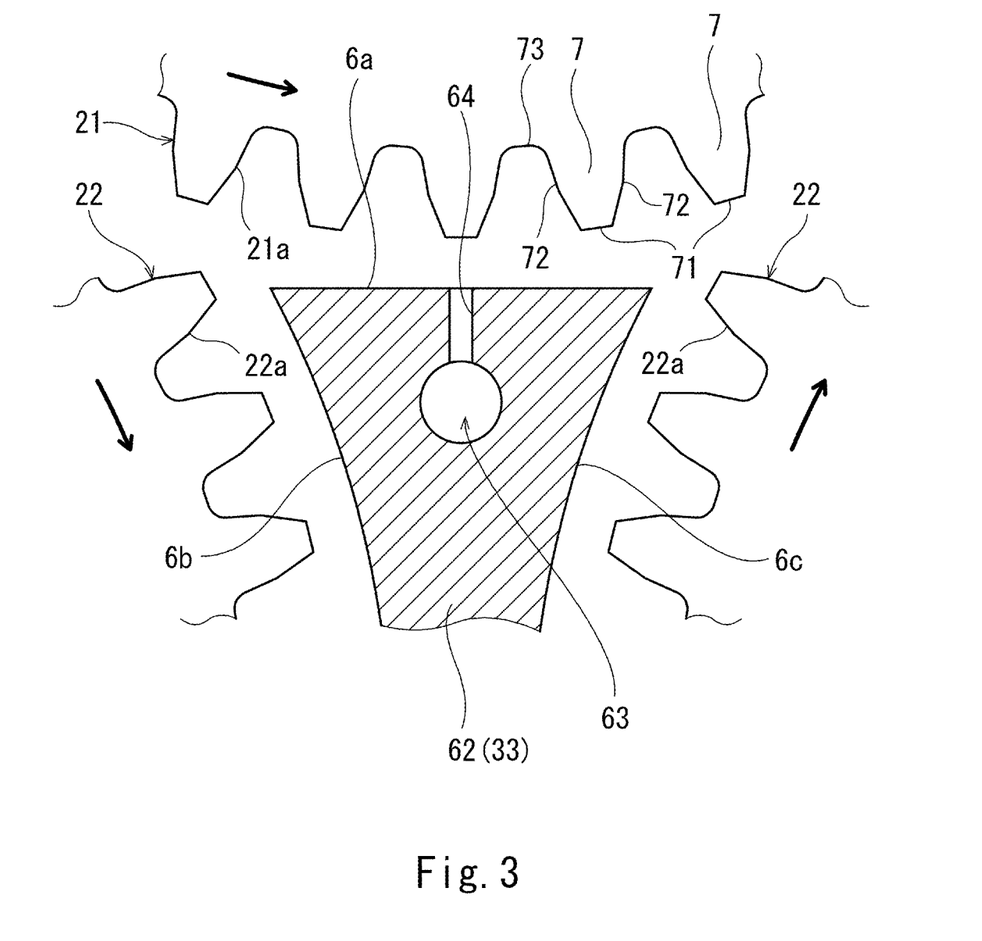
FIG. 3 is a sectional view taken along line III-III of FIG. 2.

In the present embodiment, each baffle 33 is divided into a substantially I-shaped inner portion 62 and a substantially ginkgo leaf-shaped outer portion 61. The inner portion 62 is a separate member from the front plate 31 and the back plate 32, and the outer portion 61 is integrally formed on the front plate 31.

However, the configuration of each baffle 33 is not thus limited. As one example, the outer portion 61 may be integrally formed on the back plate 32. As another example, the entire baffle 33 may be a single member separate from the front plate 31 and the back plate 32.

A collection chamber 65 for collecting the lubricating oil is formed in the outer portion 61 of each baffle 33. The outer portion 61 includes a collection opening 66 and a ring gear oil supply hole 67 formed therein. The collection opening 66 extends from one of the side surfaces 6b and 6c to the collection chamber 65, the one side surface being the side surface 6c, which is positioned at the downstream side in the rotation direction of the sun gear 21. The ring gear oil supply hole 67 extends from the collection chamber 65 to the base surface 6d. It should be noted that the collection chamber 65 may extend to the inner portion 62.

Figure 4:
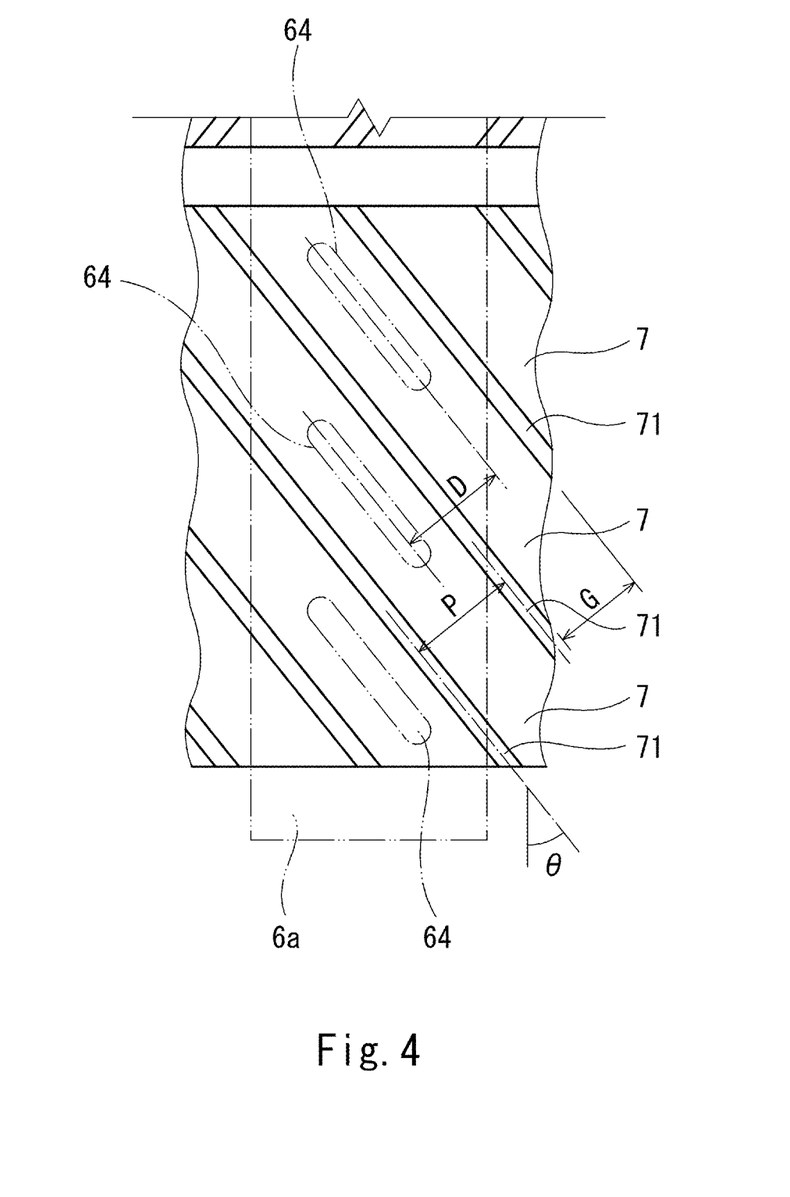
FIG. 4 is a bottom view of a part of a sun gear.

The distal end surface 6a of each baffle 33 is provided with a plurality of nozzles 64, which jet out the lubricating oil toward the toothed surface 21a of the sun gear 21. Since the sun gear 21 is a double helical gear as mentioned above, the sun gear 21 includes two sets of teeth. In each set of teeth, as shown in FIG. 4, a plurality of teeth 7 extend in a particular direction, forming an angle θ relative to the axial direction of the sun gear 21. In the present embodiment, three nozzles 64 are provided for each set of teeth of the sun gear 21 (in total, six nozzles 64 are provided).

Returning to FIG. 2, a distribution passage 63, which communicates with the nozzles 64, is formed in the inner portion 62 of each baffle 33, and a lubricating oil passage 35, which communicates with the distribution passage 63, is formed in the back plate 32 of the carrier 3. The lubricating oil passage 35 communicates with the aforementioned oil storage chamber 43, which is formed between the tubular part 41 and the cover 42. In other words, the lubricating oil is led from the lubricating oil supply passage 51 to each nozzle 64 through the groove 52, the lubricating oil introduction hole 44, the oil storage chamber 43, the lubricating oil passage 35, and the distribution passage 63.

As shown in FIG. 4, the nozzles 64 are arranged in the axial direction of the sun gear 21. Each nozzle 64 has an elongated shape parallel to the teeth 7. To be more specific, each nozzle 64 extends in the aforementioned particular direction, in which the teeth 7 extend, and has a width that is narrower than a gap G between tips 71 of the teeth 7. In other words, the length of each nozzle 64 in the particular direction is greater than the width of the nozzle 64 in the direction perpendicular to the particular direction. However, each nozzle 64 need not be perfectly parallel to the teeth 7. It will suffice if each nozzle 64 is substantially parallel to the teeth 7.

Desirably, a distance D between the center lines of the nozzles 64 is substantially the same as the pitch P between the teeth 7 (e.g., 0.8×P≤D≤1.2×P). The reason for this is that, with such a setting, the oil jetted out of adjoining nozzles 64 can be prevented from interfering with each other at a bottom land 73.

Figure 6:
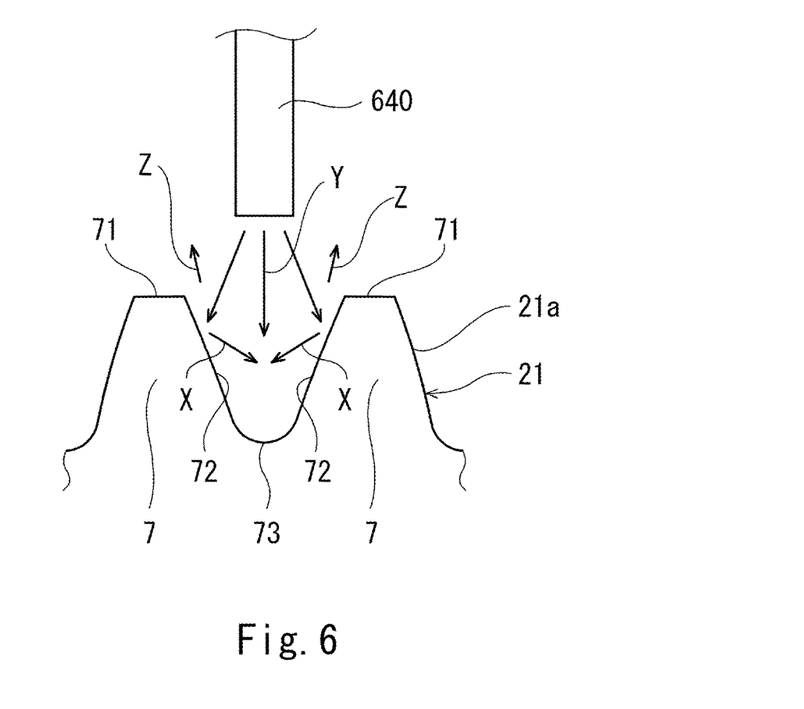
FIG. 6 shows jet streams formed by a nozzle having a circular shape.

As shown in FIG. 6, in a case where a nozzle 640 having a circular shape is adopted, jet streams X hit against sides 72 of adjoining teeth 7 and change their directions. Then, the jet streams X that have changed their directions interfere with a jet stream Y directed toward the bottom land 73.

Figure 5:
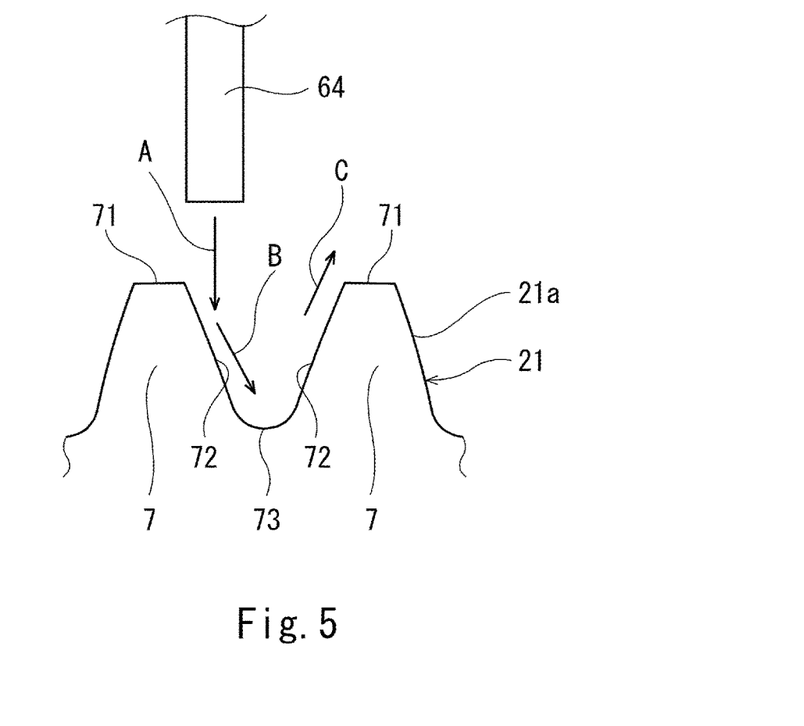
FIG. 5 shows a jet stream formed in the present embodiment.

Meanwhile, in the cooling structure of the present embodiment, as shown in FIG. 5, the oil that is jetted out of the nozzle 64 having an elongated shape forms a straight jet stream A parallel to the teeth 7. Therefore, unlike the case where the oil is jetted out of the nozzle 640 having a circular shape, the interference among jet streams will not occur, and the oil jetted out of the nozzle 64 reaches the bottom land 73 at a sufficient speed as indicated by an arrow B in FIG. 5. Therefore, even if the flow rate of the oil jetted out of each nozzle 64 is low, the sun gear 21 can be sufficiently cooled down. Consequently, a pump for circulating the oil can be made compact.

Particularly in a case where the drive unit is an aircraft gas turbine engine, the pump disposed in the gas turbine engine can be made compact, and consequently, the aircraft gas turbine engine can be made compact.

Each baffle 33 has a flow straightening effect of forming a flow of oil along the sun gear 21. In the case of adopting the nozzle 640 having a circular shape as shown in FIG. 6, the oil that has bounced off the toothed surface 21a of the sun gear 21 as indicated by arrows Z in FIG. 6 hits against the baffle 33 at various angles. Meanwhile, in the present embodiment, as indicated by an arrow C in FIG. 5, the oil that has bounced off the toothed surface 21a of the sun gear 21 forms a uniform flow along the sides 72 of the teeth 7, and flows smoothly even after hitting against the baffle 33. This makes it possible to improve the flow straightening effect of the baffle 33.

(Variations)

The present invention is not limited to the above-described embodiment. Various modifications can be made without departing from the spirit of the present invention.

For example, only one nozzle 64 may be provided for each set of teeth of the sun gear 21. In this case, however, in order to jet out the oil to the entire toothed surface 21a, it is necessary to increase the length of the nozzle 64. Consequently, the size of a region in which the nozzle 64 is formed increases in the circumferential direction of the sun gear 21 (in FIG. 4, in the right-left direction). Meanwhile, in a case where a plurality of nozzles 64 are arranged in the axial direction of the sun gear 21 as in the above-described embodiment, the region in which the nozzles 64 necessary for jetting out the oil to the entire toothed surface 21a are formed can be made small in the circumferential direction of the sun gear 21.

Figure 7:
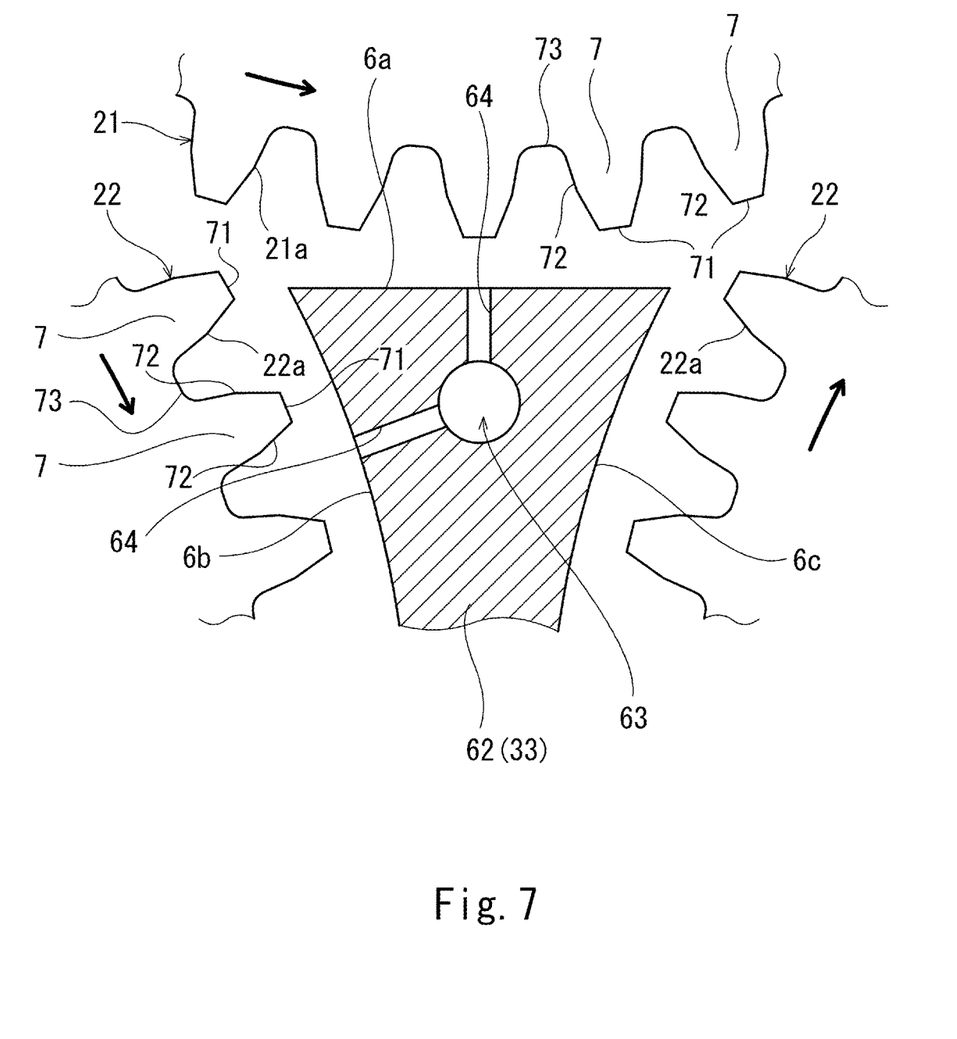
FIG. 7 is a sectional view showing a nozzle layout according to one variation.

As shown in FIG. 7, nozzles 64 may also be formed in one of the side surfaces 6b and 6c of each baffle 33, the one side surface being the side surface 6b, which is positioned at the upstream side in the rotation direction of the sun gear 21, and these nozzles 64 of each baffle 33 may jet out the oil toward the toothed surface 22a of a corresponding one of the planetary gears 22. According to this configuration, the oil is supplied to the toothed surface 22a of each planetary gear 22 after the sun gear 21 and the planetary gear 22 mesh with each other. Therefore, by utilizing negative pressure that occurs when the teeth 7 of the sun gear 21 and the teeth 7 of the planetary gear 22 separate from each other, the oil can be guided to the bottom lands 73 of the planetary gear 22. This makes it possible to obtain high cooling efficiency for the planetary gears 22.

Alternatively, the nozzles 64 may be formed not in the distal end surface 6a of each baffle 33, but only in the side surface 6b of each baffle 33.

Figure 8:
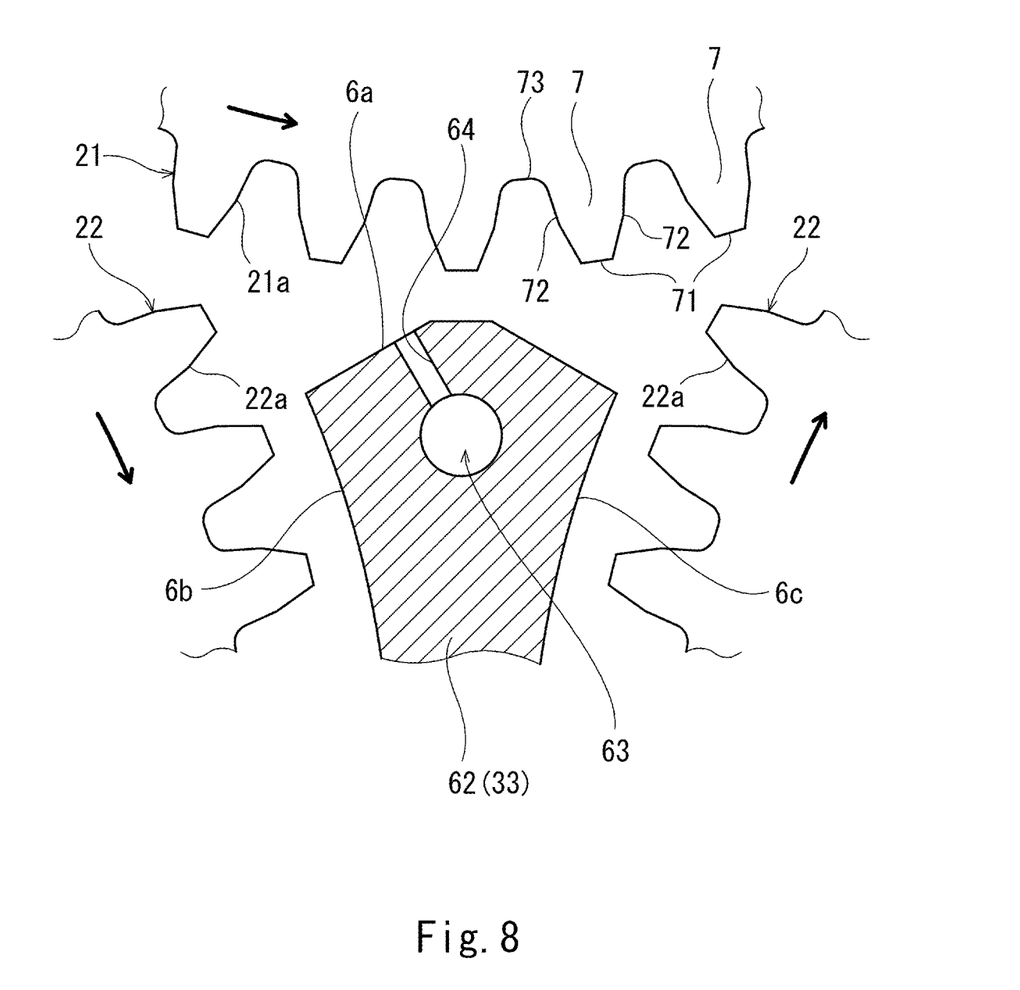
FIG. 8 is a sectional view showing an alternative shape of a baffle.

Further, it is not necessary that the entire distal end surface 6a of each baffle 33 be flat. As shown in FIG. 8, inclined surfaces may be formed on both ends of the distal end surface 6a, respectively. In this case, as shown in FIG. 8, the nozzles 64 may be open in one of the inclined surfaces.

The present invention is applicable not only to a double helical gear but also to a helical gear including a single set of teeth or to a spur gear, the teeth-extending particular direction of which is the axial direction of the gear. The gear cooling structure of the present invention is adoptable not only in the planetary gear device 1 but also in other various devices.

However, in the planetary gear device 1, since the oil concentrates in a narrow region around the sun gear 21, oil agitation loss is great. In such a planetary gear device 1, by adopting the gear cooling structure of the present invention for the sun gear 21 and/or the planetary gears 22, the oil supply amount can be reduced, and thereby the oil agitation loss can be reduced.

REFERENCE SIGNS LIST 1 planetary gear device
21 sun gear
22 planetary gear
33 baffle
6a distal end surface
6b, 6c side surface
64 nozzle
7 tooth
71 tip

The invention claimed is:

1. A gear cooling structure comprising:
   a gear including a plurality of teeth extending in a particular direction along the gear; and
   a nozzle that jets out oil toward a toothed surface of the gear, wherein
   the nozzle extends in the particular direction, and has an outlet width that is narrower than a gap between tips of the plurality of teeth, and an outlet length that is greater than the outlet width.

2. The gear cooling structure according to claim 1, wherein
   the gear is a helical gear, and
   a plurality of the nozzles are arranged in an axial direction of the gear.

3. The gear cooling structure according to claim 1, wherein
   the gear is at least one of a sun gear and a plurality of planetary gears of a planetary gear device.

4. The gear cooling structure according to claim 3, wherein
   the planetary gear device is coupled to an aircraft gas turbine engine.

5. The gear cooling structure according to claim 3, wherein
   a baffle is disposed between adjoining planetary gears of the plurality of planetary gears, the baffle including a distal end surface and a pair of side surfaces, the distal end surface facing a toothed surface of the sun gear, the pair of side surfaces facing toothed surfaces of the adjoining planetary gears, and
   the nozzle is formed in the distal end surface of the baffle, and jets out the oil toward the toothed surface of the sun gear.

6. The gear cooling structure according to claim 5, wherein
   the nozzle is formed not only in the distal end surface of the baffle, but also in one of the pair of side surfaces of the baffle, the one side surface being positioned at an upstream side in a rotation direction of the sun gear, and the nozzle formed in the one side surface jets out the oil toward the toothed surface of one of the planetary gears.

7. The gear cooling structure according to claim 5, wherein
   the planetary gear device is coupled to an aircraft gas turbine engine.

8. The gear cooling structure according to claim 1, wherein
   the outlet length is a maximum length of the nozzle, and outer most points located along the maximum length of the nozzle are disposed within the gap between tips of the plurality of teeth.

9. The gear cooling structure according to claim 8, wherein
   the outlet length is a maximum length of the nozzle, and a direction of the outlet length is along the particular direction in which the teeth extend.

10. A gear cooling structure comprising:
    a gear including a plurality of teeth extending in a particular direction along the gear; and
    a nozzle that jets out oil toward a toothed surface of the gear, wherein
    the nozzle extends in the particular direction, and has a width that is narrower than a gap between tips of the plurality of teeth, wherein
    the gear is at least one of a sun gear and a plurality of planetary gears of a planetary gear device,
    a baffle is disposed between adjoining planetary gears of the plurality of planetary gears, the baffle including a distal end surface and a pair of side surfaces, the distal end surface facing a toothed surface of the sun gear, the pair of side surfaces facing toothed surfaces of the adjoining planetary gears, and
    the nozzle is formed in one of the pair of side surfaces of the baffle, the one side surface being positioned at an upstream side in a rotation direction of the sun gear, and the nozzle jets out the oil toward the toothed surface of one of the planetary gears.

11. The gear cooling structure according to claim 10, wherein
    the planetary gear device is coupled to an aircraft gas turbine engine.

* * * * *